Figure 1:
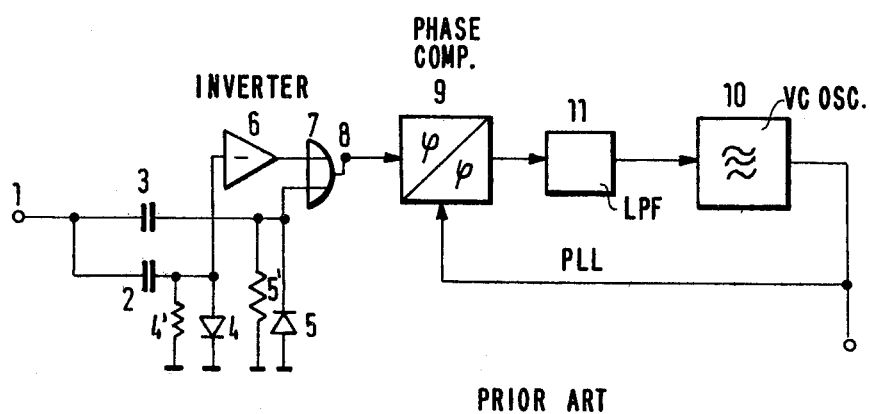

United States Patent [19]

Sochor

[11] 4,413,236

[45] Nov. 1, 1983

[54] CIRCUIT FOR DERIVING A TIMING SIGNAL FROM DIGITAL IMPUT SIGNALS

[75] Inventor: Josef Sochor, Darmstadt, Fed. Rep. of Germany

[73] Assignee: Robert Bosch GmbH, Stuttgart, Fed. Rep. of Germany

[21] Appl. No.: 216,938

[22] Filed: Dec. 16, 1980

[30] Foreign Application Priority Data

Dec. 19, 1979 [DE] Fed. Rep. of Germany ....... 2951134

[51] Int. Cl.³ .............................................. H03L 7/06
[52] U.S. Cl. ................................. 331/25; 331/117 R; 331/173; 375/120
[58] Field of Search ................... 331/1 A, 18, 25, 173; 375/120; 328/155

[56] References Cited

U.S. PATENT DOCUMENTS 3,493,868  2/1970  Hackett, Jr. ...................... 331/18 X
4,287,480  9/1981  Swift et al. ........................ 331/25 X
4,310,805  1/1982  Hackert et al. ................... 331/25 X Primary Examiner—Siegfried H. Grimm
Attorney, Agent, or Firm—Frishauf, Holtz, Goodman & Woodward

[57] ABSTRACT

To obtain a timing signal in the regeneration of digital pulses from recordings or after transmission, two start-stop oscillators are triggered, respectively, by signals to be regenerated and by the same signals after inversion. The output signals from these oscillators are combined into a single signal which has the frequency of the desired timing signal, and a flywheel circuit is used to produce a continuously alternating voltage. Each of the start-stop oscillators is conveniently implemented by a pair of transistors whose emitters are interconnected by an inductor and individually connected to an operating voltage via a capacitor and a resistor, respectively.

2 Claims, 4 Drawing Figures

CIRCUIT FOR DERIVING A TIMING SIGNAL FROM DIGITAL IMPUT SIGNALS

Filed of even date and assigned to the assignee of the present application is a patent application Ser. No. 216,863, filed Dec. 16, 1980, entitled "Circuit for Producing Timing Pulses in the Regeneration of Square Signals" by the inventor of the subject matter of the present application now issued as U.S. Pat. No. 4,360,781.

The present invention relates to circuitry for obtaining a timing signal and, more particularly, for obtaining a timing signal from transmitted digital signals.

BACKGROUND AND PRIOR ART

In the transmission of digital signals and the reproduction of recorded digital signals it is necessary to regenerate the signals because of deviations from an original square shape due to various influences such as, e.g., band limitation and amplitude and phase deviations in the transmission characteristic. The regeneration is usually effected by bit-by-bit sampling of pulses at times at which no pulse edges are expected. This calls for the generation of a timing signal whose frequency and phase satisfy these requirements and which duly follows variations in pulse transit time.

For the generation of such a timing signal it is known, e.g., to obtain timing pulses from the edges of signals pulses and to use such timing pulses to control a variable oscillator. (See *Marconi Review*, No. 193, Second Quarter 1974, p. 93 et seq.) A necessary phase comparison can be carried out by means of one of two different circuits. One such circuit provides for the multiplication of sinusoidal or square voltage signals to be compared. However, in many codes suitable for digital transmission or recording, pulse edges occur only at irregular intervals. This is a drawback when such phase comparison circuitry is used because, in the absence of pulses, the control voltage does not remain at the last-available value. While phase comparison circuitry based on sampling and latching principles is not subject to this drawback, such latter circuitry requires pulses having very short duration; accordingly, these circuits are difficult to implement for high-frequency applications.

THE INVENTION

It is an object of the invention to conveniently provide for circuitry which avoids the above-mentioned drawbacks and which eliminates the need for fast, critical components in circuitry for obtaining a timing signal. Furthermore, a circuit in accordance with the invention provides for reliable regeneration even in various fault situations such as, e.g., when pulses are missing or when extraneous pulses are present.

The timing circuit of the invention includes a pair of start-stop oscillators, one to receive an input signal and the other to receive the inverted input signal. The outputs of the start-stop oscillators are supplied, after combination in a combining circuit, to the input of a phase comparator whose output controls (via a low pass filter) a variable oscillator. The other input of the phase comparator receives a signal from the variable oscillator and this signal is also used to control a square wave generator. The output from the square wave generator is the desired timing signal.

Also in accordance with the invention, a start-stop oscillator includes a pair of transistors, an inductor, a capacitor, and a resistor. The emitters of the two transistors are interconnected by the inductor and the base of at least one of the transistors can be connected to a control voltage. The emitter of one transistor is connected to the capacitor which, in turn, can be connected to a pole of an operating voltage. The emitter of the other transistor is connected to the resistor which, in turn, can also be connected to this pole of the operating voltage. The collectors of both transistors can be connected to the other pole of the operating voltage.

THE DRAWING

An embodiment of the invention is shown in the drawing by means of several figures and described below in further detail.

Figure 2:
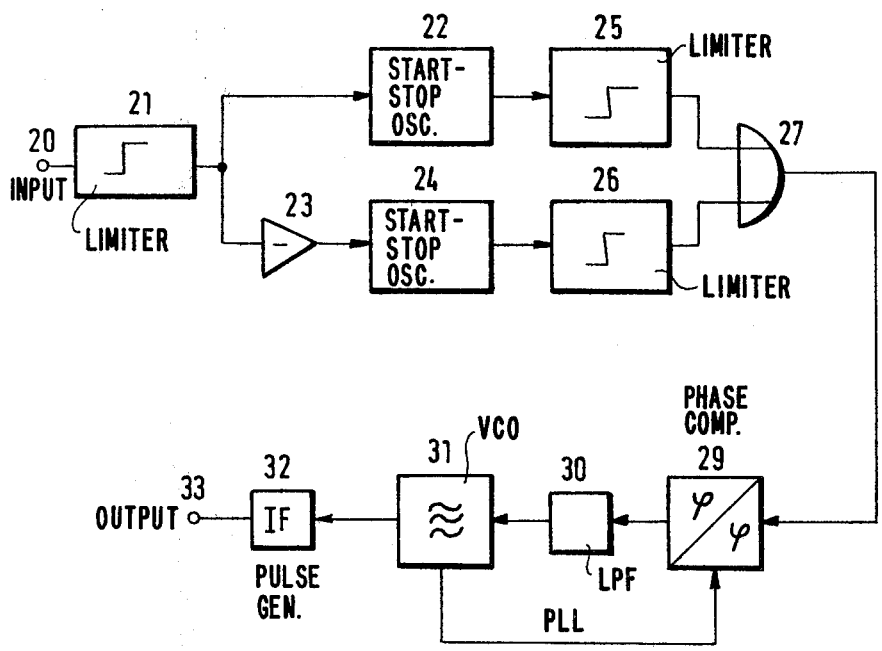
Figure 3:
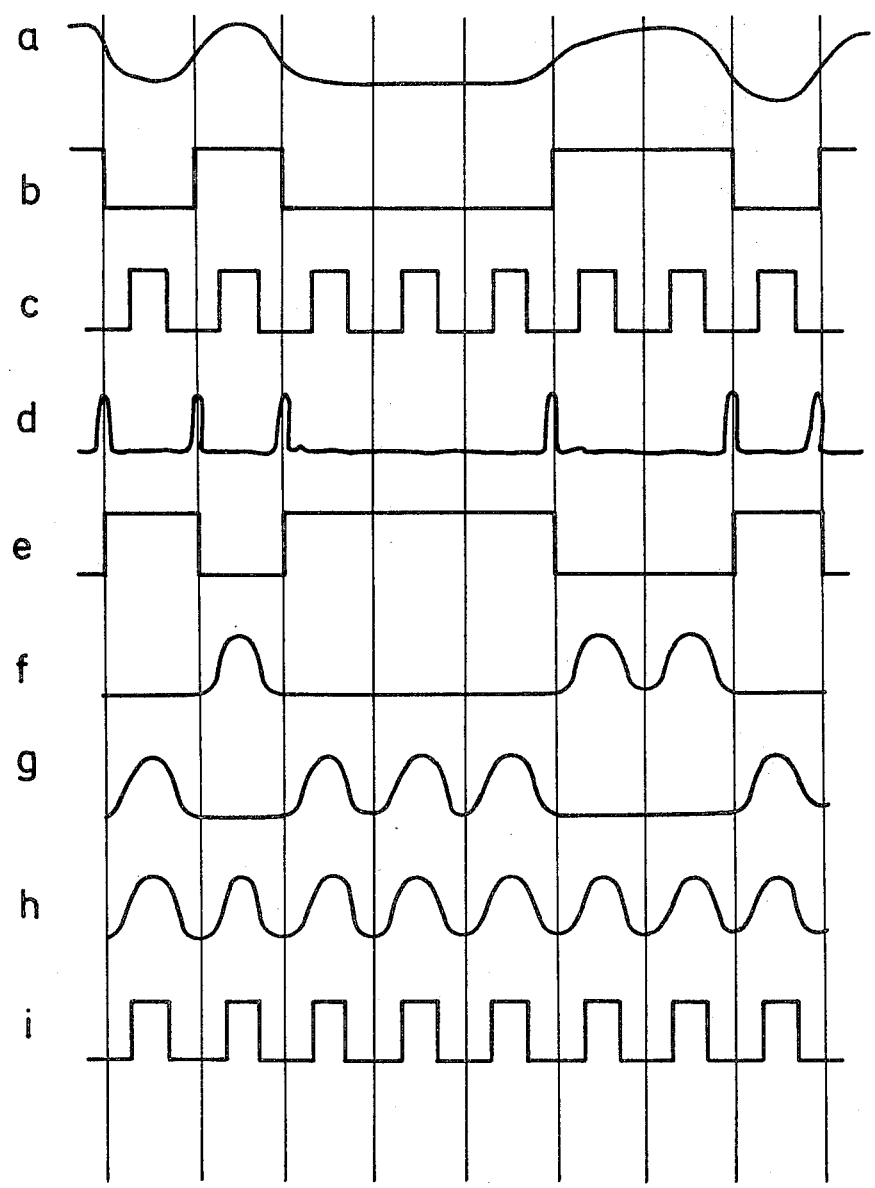
Figure 4:
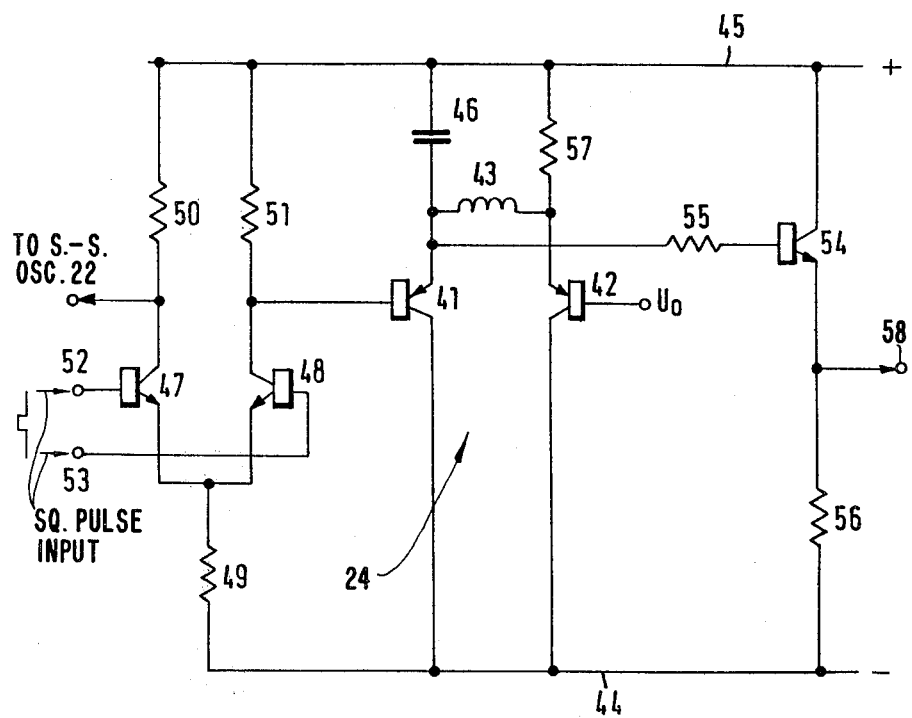

FIG. 1 shows a prior art circuit for the regeneration of a timing signal;

FIG. 2 schematically shows an embodiment of the invention;

FIG. 3 shows by curves a through i voltage waves occurring in circuits according to FIGS. 1 and 2 drawn to a common time scale; and FIG. 4 shows an embodiment of a start-stop oscillator.

The circuit of FIG. 1 receives, at input 1, pulses which are to be regenerated. These may be shaped, e.g., as shown in FIG. 3, curve a. Before transmission or recording, these signals may have had a shape such as shown in FIG. 3, curve b, and the regeneration of this shape is desired. This requires sampling of the pulses in the so-called bit cells. Such sampling, in turn, requires a timing signal whose shape is shown in FIG. 3, curve c. According to prior art circuitry shown in FIG. 1, the signal shown in FIG. 3, curve a is supplied to two differentiating circuits having respective capacitors 2 and 3, diodes 4 and 5, and resistors 4' and 5'. When a signal has a negative slope, a short negative pulse is produced at diode 4 and, when a signal has a positive slope, a positive pulse is produced at diode 5. The polarity of negative pulses is reversed by means of a reversing amplifier 6, and the reversed signals are added to the positive pulses by means of AND/OR circuit 7. As a result, a pulse train as shown in FIG, 3, curve d is produced at the output terminal 8 of gate 7. This pulse train is supplied to the input of a phase comparator circuit 9 whose other input is supplied with the output voltage of a variable oscillator 10. The result of the phase comparison is supplied via the low pass filter 11 to the control input of the variable oscillator 10. Such so-called flywheel circuit (also known as PLL circuit) has the effect of suppressing the effect of short-duration faults in the pulse train shown in FIG. 3, curve d, provided the time constant of the low pass filter 11 is large. For proper functioning of the phase comparator circuit 9 it is required, however, that pulses be very short; this requirement is difficult to meet in the case of the transmission of high-frequency signals.

As shown in FIG. 2, an embodiment of a circuit in accordance with the invention has a pulse input terminal 20 Input pulses are supplied via a limiter stage 21 to a start-stop oscillator 22 and, inverted by inverting amplifier 23, to an additional start-stop oscillator 24. The output voltage of the inverting amplifier 23 is shown in FIG. 3, curve e. The start-stop oscillators 22 and 24 are ordinary since wave oscillators which are tuned to the timing frequency and which oscillate in the presence of input pulses, or rather are made as in FIG. 4 in order to start to oscillate at the very beginning of a pulse. As a result, output voltages of the start-stop oscillators 22 and 24 are as shown in FIG. 3, curves f and g. Consequently, the sinusoidal output voltages are limited by limiter stages 25 and 26 and combined in AND/OR circuitry 27. The output signal from circuit 27 is shown in FIG. 3, curve h; it is supplied to a PLL circuit which consists of a phase comparator circuit 29, a low pass filter 30, and an oscillator 31. The sampling pulses are formed from the output voltage of the oscillator 31 by means of a pulse generator 32; such pulses are shown in curve i of FIG. 3.

Details of the start-stop oscillator 24 are shown in FIG. 4. Such oscillator consists essentially of the transistors 41 and 42 whose emitters are connected to each other by inductor 43 and whose collectors are connected to the negative terminal 44 of a voltage source. The emitter of the transistor 42 is connected via the resistor 57 to the positive terminal 45 of the voltage source, and the emitter of the transistor 41 is connected via the capacitor 46 to constant potential, in this case that of the positive terminal 45. The base of the transistor 42 is connected to a fixed potential $U_o$.

The square pulses are supplied, at terminals 52 and 53, to a differential amplifier which is formed by the transistors 47 and 48 and the resistors 49, 50 and 51. The output voltages at the collectors of transistors 47 and 48 have opposite phase; accordingly, transistor 48 serves as an inverting amplifier 23 (FIG. 2). The collector of the transistor 47 is connected by means not shown to the start-stop oscillator 22.

If the pulses at the collector of the transistor 48 have a positive voltage, the transistor 41 is nonconducting, and the inductor 43 and the capacitor 46 form a parallel resonance circuit. (One terminal of the inductor 43 is connected to the capacitor 46 and the other to the constant voltage operating potential 44 via the emitter-collector path of the transistor 42.) The resonant circuit is made to oscillate by the edge of the pulse. Its quality is such that, in practice, no significant damping occurs during inter-pulse gaps. The oscillations are supplied to the output terminal 58 via the impedance converter which consists of the transistor 54 and the resistors 55 and 56.

The transistor 41 is conducting during the negative excursions of the pulses at the collector of the transistor 48; as a result, the reasonant circuit is damped strongly and the oscillations stop.

EXAMPLE

For an expected timing pulse frequency of timing pulses per second, the following circuit components are appropriately chosen: An inductor 43 of 0.25 μH, a capacitor 46 of 16 pF, and a resistor 57 of 1kΩ.

I claim:

1. Electrical circuit for producing a timing signal for the regeneration of pulses, said circuit comprising a first start-stop oscillator (22), a second start-stop oscillator (24), a combining circuit (27), a phase comparator circuit (29), a low pass filter (30), a variable oscillator (31), a pulse generator (32), means (20,21) for supplying input signals to said first start-stop oscillator (22), means (20,21,23) for supplying inverted input signals to said second start-stop oscillator (24), means (25) for supplying the output signals of said first start-stop oscillator (22) to said combining circuit (27), means (26) for supplying the output signals of said second start-stop oscillator (24) to said combining circuit (27), means for supplying the output of said combining circuit (27) to a first input terminal of said phase comparator circuit (29), means for supplying the output signal of said phase comparator circuit (29) to said low pass filter (30), means for supplying the output signal of said low pass filter (30) to said variable oscillator (31), means for supplying the output signal of said variable oscillator (31) to a second input terminal of said comparator circuit (29) and to said pulse generator (32).

2. Circuit according to claim 1, wherein said first and second start-stop oscillator each comprises:
a first transistor (41);
a second transistor (42);
an inductor (43);
a capacitor (46), and a resistor (57),
the base of said first transistor (41) being connectable in the case of said first start-stop oscillator (22) to said input signal supplying means (20,21,47) and, in the case of said second start-stop oscillator (24), to said inverted input signal supplying means (23,48), the emitter of said first transistor (41) being connected to said capacitor (46) and said capacitor (46) being connected to a first pole of an operating voltage, the base of said second transistor being connected to a fixed voltage ($U_o$), the emitter of said second transistor being connected to said resistor (57) and said resistor being connectable to said first voltage pole, said inductor being connected between the respective emitters of said first and second transistors, and the collectors of said first transistor (41) and said second transistor (42) being both connected to the second pole of said operating voltage,
said means (25,26,54-56) for supplying the outputs of said start-stop oscillators to said combining circuit (27) including connections to the respective first transistor of said start-stop oscillators (22,24).

* * * * *